(12) United States Patent
Kong et al.

(10) Patent No.: US 7,682,587 B2
(45) Date of Patent: Mar. 23, 2010

(54) FUEL CELL REFORMER

(75) Inventors: Sang-Jun Kong, Suwon-si (KR);
Ju-Yong Kim, Suwon-si (KR);
Dong-Yun Lee, Yongin-si (KR);
Chan-Ho Lee, Suwon-si (KR);
Sung-Chul Lee, Suwon-si (KR);
Dong-Myung Suh, Suwon-si (KR);
Myeong-Ju Ha, Suwon-si (KR);
Dong-Uk Lee, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 432 days.

(21) Appl. No.: 11/490,754

(22) Filed: Jul. 20, 2006

(65) Prior Publication Data

US 2007/0025892 A1   Feb. 1, 2007

(30) Foreign Application Priority Data

Jul. 29, 2005  (KR) .................. 10-2005-0069610

(51) Int. Cl.
*H01M 8/08* (2006.01)
(52) U.S. Cl. .................. 423/418; 429/12; 429/34; 518/702; 422/202
(58) Field of Classification Search .......... 423/648; 422/202, 209
See application file for complete search history.

(56) References Cited

U.S. PATENT DOCUMENTS 6,506,359 B1 * 1/2003 Maruko .................. 423/648.1

6,911,187 B2 * 6/2005 Maruko .................. 422/209

(Continued)

FOREIGN PATENT DOCUMENTS

JP         6-48701         2/1994

(Continued)

OTHER PUBLICATIONS

Patent Abstracts of Japan, Publication No. 2002-160002; Date of Publication: Jun. 4, 2002; in the name of Nobuki Nishimura et al.

(Continued)

*Primary Examiner*—Melvin C Mayes
*Assistant Examiner*—Colette Nguyen
(74) *Attorney, Agent, or Firm*—Christie, Parker & Hale, LLP

(57) ABSTRACT

A fuel cell reformer includes a main body having a first pipe with a second pipe inside the first pipe, a thermal source unit in the second pipe, a reforming reaction unit in a first region between the first pipe and the second pipe to generate a reforming gas containing hydrogen through a reforming reaction of a fuel, and a carbon monoxide reduction unit in a region other than the first region between the first pipe and the second pipe to reduce a concentration of carbon monoxide contained in the reforming gas. A thermal treatment unit in the main body supplies thermal energy to the reforming reaction unit and the carbon monoxide reduction unit at a time of initial driving of the reformer such that the supplied thermal energy corresponds to a unique operational temperature range in the reforming reaction unit, and to a unique operational temperature range in the carbon monoxide reduction unit.

20 Claims, 7 Drawing Sheets

U.S. PATENT DOCUMENTS

| | | |
|---|---|---|
| 2002/0132147 A1 | 9/2002 | Gao |
| 2003/0161768 A1* | 8/2003 | Kawamoto et al. .......... 422/188 |
| 2005/0191532 A1 | 9/2005 | Kim et al. |
| 2005/0271907 A1* | 12/2005 | Kim et al. ..................... 429/12 |
| 2007/0072950 A1* | 3/2007 | Lee et al. .................... 518/702 |

FOREIGN PATENT DOCUMENTS

| | | |
|---|---|---|
| JP | 2001/155756 | * 11/1999 |
| JP | 2001-155756 | 6/2001 |
| JP | 2001-155756 | * 8/2001 |
| JP | 2002-160002 | 6/2002 |
| JP | 2002-208426 | 7/2002 |
| JP | 2003-95610 | 4/2003 |
| JP | 2003-327405 | 11/2003 |
| JP | 2004-323353 | 11/2004 |
| JP | 2005-243649 | 9/2005 |
| KR | 1996-0034070 | 10/1996 |
| KR | 2002-0092373 | 12/2002 |
| KR | 10-2005-0116436 | 12/2005 |
| KR | 10-2006-0000426 | 1/2006 |
| WO | WO 01/64577 A1 | 9/2001 |

OTHER PUBLICATIONS

Patent Abstracts of Japan, Publication No. 2001-155756; Date of Publication: Jun. 8, 2001; in the name of Hiroshi Fujiki.

Korean Patent Abstracts for Registered Korean Patent No. 100314829 B1; Publication No. 1996-0034070; Date of Publication: Nov. 2, 2001; in the name of Jae Seong Han et al.

Korean Patent Abstracts, Publication No. 1020050116436 A; Date of Publication: Dec. 12, 2005; in the name of Ju Yong Kim et al.

Korean Patent Abstracts, Publication No. 1020060000426 A; Date of Publication: Jan. 6, 2006; in the name of Ju Yong Kim et al.

Patent Abstracts of Japan, Publication No. 06-048701; Date of Publication: Feb. 22, 1994; in the name of Yoshimasa Fujimoto et al.

Patent Abstracts of Japan, Publication No. 2002-208426, Published on Jul. 26, 2002, in the name of Komiya.

Patent Abstracts of Japan, Publication No. 2003-095610; Date of Publication: Apr. 3, 2003; in the name of Satonobu Yasutake et al.

Patent Abstracts of Japan, Publication No. 2004-323353; Date of Publication: Nov. 18, 2004; in the name of Toshiyasu Miura et al.

Patent Abstracts of Japan, Publication No. 2005-243649; Date of Publication: Sep. 8, 2005; in the name of Ju-Yong Kim et al.

* cited by examiner

FUEL CELL REFORMER

CROSS-REFERENCES TO RELATED APPLICATION

This application claims priority to and the benefit of Korean Patent Application No. 10-2005-0069610 filed on Jul. 29, 2005, in the Korean Intellectual Property Office, the entire content of which is incorporated herein by reference.

BACKGROUND

A fuel cell system employing a polymer electrolyte membrane fuel cell (PEMFC) includes a fuel cell main body that is referred to as a stack, a reformer that reforms the fuel to generate a reforming gas containing hydrogen and that supplies the reforming gas to the fuel cell main body, and an oxidant gas supply unit that supplies an oxidant gas to the oxidant gas supply unit. The oxidant gas supply unit generates electrical energy through an electrochemical reaction of the reforming gas, supplied from the reformer, and the oxidant gas, supplied from the oxidant gas supply unit.

In such a fuel cell system employing the polymer electrolyte membrane fuel cell, a conventional reformer includes a thermal source unit that generates thermal energy, a reforming reaction unit that generates the reforming gas containing hydrogen through a reforming reaction of the fuel using the thermal energy, and a carbon monoxide reduction unit that reduces a concentration of carbon monoxide contained in the reforming gas.

In the conventional reformer, thermal energy corresponding to unique operational temperature ranges of the reforming reaction unit and the carbon monoxide reduction unit are supplied to the reforming reaction unit and the carbon monoxide reduction unit at the time of initial driving of the reformer in order to obtain optimal operational efficiency. However, it is difficult to control the thermal energy supplied from the thermal source unit to the reforming reaction unit and the carbon monoxide reduction unit. Therefore, the operational efficiency of the reformer is limited.

SUMMARY

A fuel cell reformer, includes a main body having a first pipe and a second pipe, the second pipe being disposed at an inner portion of the first pipe; a thermal source unit being disposed in the second pipe to generate heat; a reforming reaction unit being disposed in a first region between the first pipe and the second pipe to generate a reforming gas containing hydrogen through a reforming reaction of a fuel; and a carbon monoxide reduction unit being disposed in a region other than the first region between the first pipe and the second pipe to reduce a concentration of carbon monoxide contained in the reforming gas. The fuel cell reformer also includes a thermal treatment unit being disposed in the main body to supply thermal energy to the reforming reaction unit and to the carbon monoxide reduction unit at a time of initial driving of the reformer. The thermal energy supplied to the reforming reaction unit corresponds to an operational temperature range of the reforming reaction unit that is unique, and the thermal energy supplied to the carbon monoxide reduction unit corresponds to an operational temperature range of the carbon monoxide reduction unit that is unique.

In one embodiment, the thermal treatment unit allows the reforming reaction unit to maintain the operational temperature range of the reforming reaction unit, which is higher than the operational temperature range of the carbon monoxide reduction unit. The carbon monoxide reduction unit may include a first reaction unit disposed in a second region proximate to the first region to reduce the concentration of carbon monoxide through a water gas shift reaction of the carbon monoxide.

The fuel cell reformer may also include a barrier member having a shape of a mesh and being disposed between the first pipe and the second pipe to partition the first region and the second region.

In one embodiment, the thermal treatment unit allows the reforming reaction unit to maintain the operational temperature range of the reforming reaction unit of from 700° C. to 800° C. and allows the first reaction unit to maintain the operational temperature range of the first reaction unit of from 200° C. to 500° C.

In one embodiment, the carbon monoxide reduction unit includes a second reaction unit disposed in a third region proximate to the second region to reduce the concentration of carbon monoxide through a preferential oxidation reaction of the carbon monoxide. The thermal treatment unit may also allow the reforming reaction unit to maintain the operational temperature range of from 700° C. to 800° C. and may allow the second reaction unit to maintain an operational temperature range of the second reaction unit of from 150° C. to 200° C.

The thermal treatment unit may include a thermal isolation member surrounding an outer surface of the first pipe corresponding to the reforming reaction unit to isolate the thermal energy supplied from the thermal source unit to the reforming reaction unit.

The thermal treatment unit may include a first portion of the second pipe corresponding to the reforming reaction unit; and a second portion of the second pipe corresponding to the carbon monoxide reduction unit. A cross-sectional area of the first portion may be larger than that of the second portion.

The thermal treatment unit may include a barrier member being disposed to perform a reciprocating motion in an inner space of the second pipe and a torch member connected to the second pipe to ignite and burn the fuel.

The thermal source unit may be constructed by filling an inner space of the second pipe with an oxidation catalyst to generate the thermal energy through an oxidation reaction of the fuel by using the oxidation catalyst. The reforming reaction unit may be constructed by filling the first region with a reforming catalyst. The first reaction unit may be constructed by filling the second region with a water gas shift catalyst, and the second reaction unit may be constructed by filling the third region with an oxidation catalyst.

The fuel may be a gaseous fuel containing butane as a main component, liquid petroleum gas, or liquefied natural gas.

One embodiment of a fuel cell reformer, includes a main body having a first pipe and a second pipe, the second pipe being disposed at least partially within the first pipe; a thermal source unit proximate to the second pipe to generate heat therein; a reforming reaction unit being disposed in a first region between the first pipe and the second pipe to generate a reforming gas containing hydrogen through a reforming reaction of a fuel; and a carbon monoxide reduction unit being disposed in a region other than the first region between the first pipe and the second pipe to reduce a concentration of carbon monoxide contained in the reforming gas. A thermal treatment unit is disposed in the main body to supply thermal energy to the reforming reaction unit and to the carbon monoxide reduction unit at a time of initial driving of the reformer. The thermal energy supplied to the reforming reaction unit corresponds to an operational temperature range of the reforming reaction unit, and the thermal energy supplied to the carbon monoxide reduction unit corresponds to an operational temperature range of the carbon monoxide reduction unit.

BRIEF DESCRIPTION OF THE DRAWINGS

The above and other features and aspects of the present invention will become more apparent in light of the following detailed description of exemplary embodiments thereof with reference to the attached drawings, in which.

DETAILED DESCRIPTION

Various examples of embodiments of the present invention will now be described with reference to the accompanying drawings in detail so as to be easily implemented by those of ordinary skill in the art. The present invention can be implemented in various forms, and is not limited to the embodiments described below.

Figure 1:
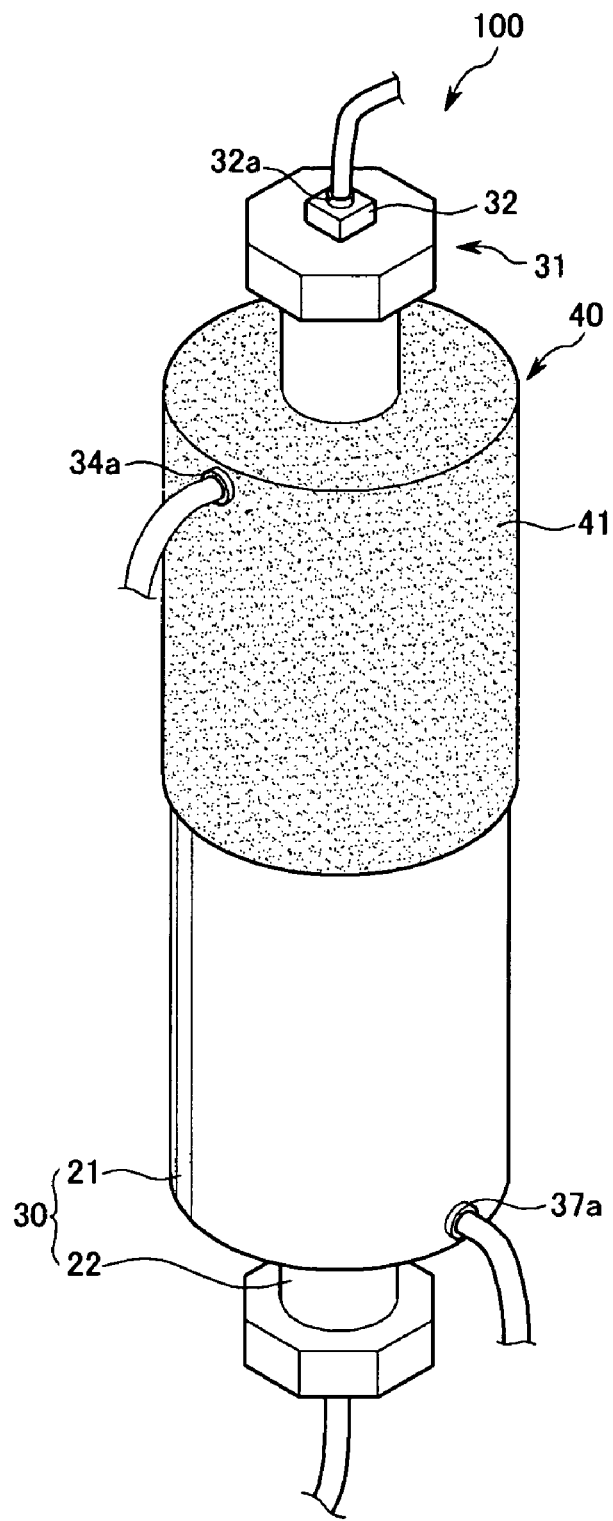
FIG. 1 is a perspective view showing a fuel cell reformer according to a first embodiment of the present invention.
Figure 2:
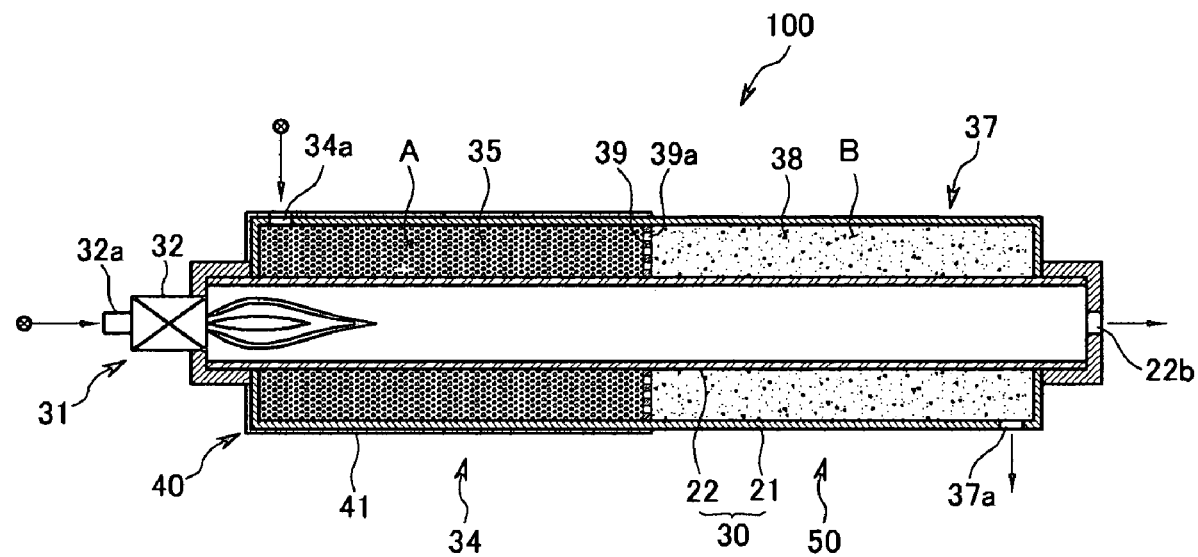
FIG. 2 is a cross-sectional view of the reformer of FIG. 1.

Referring to FIGS. 1 and 2, a fuel cell reformer 100 according to a first embodiment of the present invention has a structure for burning a gaseous fuel such as liquid petroleum gas (LPG) or liquefied natural gas (LNG) and more preferably a liquefied gaseous fuel containing butane as a main component to generate thermal energy. The fuel cell reformer 100 generates a reforming gas containing hydrogen through a reforming reaction of the gaseous fuel using the thermal energy, and reduces a concentration of carbon monoxide contained in the reforming gas.

The fuel cell reformer 100 is used for a general fuel cell system employing a polymer electrolyte membrane fuel cell that generates electrical energy through an oxidation reaction of the reforming gas and a reduction reaction of an oxidant gas. Therefore, the fuel cell reformer 100 has a function of supplying the reforming gas to the polymer electrolyte membrane fuel cell.

The fuel cell reformer 100 includes a thermal source unit 31 that burns the fuel to generate thermal energy, a reforming reaction unit 34 that generates the reforming gas containing hydrogen from the fuel through a reforming reaction of the fuel using the thermal energy, and a carbon monoxide reduction unit 50 that reduces a concentration of carbon monoxide contained in the reforming gas.

The fuel cell reformer 100 includes a reformer main body 30 having the shape of a concentric double pipe. The reformer main body 30 includes a first pipe 21 and a second pipe 22 that is disposed at an inner portion of the first pipe 21.

The first pipe 21 has a shape of a cylinder with a predetermined cross-sectional area and substantially closed ends. The second pipe 22 has a shape of a cylinder with a cross-sectional area that is smaller than that of the first pipe 21 and has substantially closed ends. The first and second pipes 21 and 22 are disposed in an inner axial direction (a concentric axial direction) of the first pipe 21 so that an outer surface of the second pipe 22 is separated by a predetermined interval from an inner surface of the first pipe 21.

In the fuel cell reformer 100 according to this embodiment, the thermal source unit 31 includes a torch member 32 that is connected to one end portion of the second pipe 22. The torch member 32 ignites and burns the fuel with air to generate a flame and blows the flame into an inner space of the second pipe 22.

The torch member 32 includes a general igniter plug (not shown) for igniting and burning the fuel with air, and a first injection hole 32a through which the fuel and the air are injected into the inner space of the second pipe 22. Here, the first injection hole 32a may be connected to a fuel tank (not shown) and an air pump (not shown) with pipe lines or the like.

In addition, in the thermal source unit 31, a first discharging hole 22b for discharging combustion gas generated by the burning of the fuel with the air by the torch member 32 is disposed at the other end portion of the second pipe 22.

In the reforming reaction unit 34 according to this embodiment of the present invention, the space between the first and second pipes 21 and 22 is partitioned into first and second regions A and B, and the first region A is filled with a reforming catalyst 35.

Here, the first region A is a region between the second pipe 22 and the first pipe 21 at one end portion of the second pipe 22. The second region B is a region between the second pipe 22 and the first pipe 21 at the other end portion of the second pipe 22. The first and second regions A and B are partitioned by a barrier member 39 having the shape of a mesh. The barrier member 39 includes a plurality of holes 39a and has the shape of a ring where the second pipe 22 passes through a central portion thereof.

In addition to the function of partitioning the inner space between the first and second pipes 21 and 22 into the first and second regions A and B, the barrier member 39 has a function of allowing the reforming gas generated by the reforming reaction unit 34 to flow into the carbon monoxide reduction unit 50 through the aforementioned holes 39a.

In the reforming reaction unit 34, the reforming catalyst 35 has a function of precipitating steam reforming (SR) of the fuel and water. The reforming catalyst 35 may have a structure wherein a catalytic material, such as copper (Cu), nickel (Ni), or platinum (Pt), is contained in a pellet-shaped carrier made of alumina ($Al_2O_3$), silica ($SiO_2$), or titania ($TiO_2$).

In addition, the reforming reaction unit 34 is provided with a second injection hole 34a through which the fuel and water are injected into the first region A. The second injection hole 34a is formed in the first pipe 21. The second injection hole 34a may be connected to a fuel tank and a water tank (not shown) with pipe lines or the like.

The carbon monoxide reduction unit 50 according to this embodiment has a function of reducing a concentration of carbon monoxide contained in the reforming gas generated by the reforming reaction unit 34. In general, the carbon monoxide reduction unit 50 includes a first reaction unit 37 for reducing the concentration of carbon monoxide through a water gas shift (WGS) reaction.

The first reaction unit 37 is constructed by filling the second region B between the first and second pipes 21 and 22 with a water gas shift catalyst 38. The water gas shift catalyst 38 is used to precipitate the water gas shift reaction of the carbon monoxide contained in the reforming gas. The water gas shift catalyst 38 may be constructed by containing a catalytic material such as copper (Cu), zinc (Zn), iron (Fe), and chromium (Cr) in a pellet-shaped carrier made of alumina ($Al_2O_3$), silica ($SiO_2$), or titania ($TiO_2$).

The first reaction unit 37 is provided with a second discharging hole 37a for discharging the reforming gas of which concentration of carbon monoxide is reduced from the second region B. The second discharging hole 37a is formed in the first pipe 21. The second discharging hole 37a may be connected to a fuel cell (not shown) with a pipe line or the like.

In the fuel cell reformer 100 having the aforementioned construction, the reforming reaction unit 34 is supplied with the thermal energy from the thermal source unit 31 to be preheated to the operational temperature range of from 700° C. to 800° C. and generate the reforming gas through the reforming reaction of the fuel and the water in the preheated state. The first reaction unit 37 is supplied with the thermal energy from the thermal source unit 31 to be preheated to the operational temperature range of from 200° C. to 500° C. and reduces the concentration of carbon monoxide through the water gas shift reaction of the carbon monoxide contained in the reforming gas in the preheated state.

The conditions of the operational temperatures of the reforming reaction unit 34 and the first reaction unit 37 are but examples for properly performing the unique reactions thereof. Therefore, the operational temperature ranges as described above for the reaction units are not limited thereto, but the operational temperature ranges may vary according to types and operation performance of the fuel cell, operation performance of the reaction units, catalysts, and the like.

At the time of initial driving of the fuel cell reformer 100, the reforming reaction unit 34 and the first reaction unit 37 are supplied with thermal energy corresponding to the unique operational temperature ranges thereof in order to obtain optimal operation efficiency of the fuel cell reformer 100. In the fuel cell reformer 100, since the reforming reaction unit 34 and the first reaction unit 37 are sequentially disposed between the first and second pipes 21 and 22 with respect to the thermal source unit 31 interposed therebetween, the reforming reaction unit 34 and the first reaction unit 37 are simultaneously supplied with thermal energy from the thermal source unit 31.

Therefore, it is difficult to control the thermal energy supplied from the thermal source unit 31 to the reforming reaction unit 34 and the first reaction unit 37.

For this reason, the fuel cell reformer 100 according to this embodiment is provided with a thermal treatment unit 40 for supplying thermal energy corresponding to the unique operational temperature conditions to the reforming reaction unit 34 and the first reaction unit 37.

The thermal treatment unit 40 according to this embodiment includes a thermal isolation member 41 that is disposed to surround an outer surface of the first pipe 21 corresponding to the reforming reaction unit 34. The thermal isolation member 41 has a function of thermally isolating a portion of the first pipe 21 corresponding to the reforming reaction unit 34 so as to prevent the thermal energy supplied by the reforming reaction unit 34 from releasing outwardly.

The thermal isolation member 41 is formed to have a shape of a sheet or film that surrounds the outer surface of the first pipe 21 corresponding to the reforming reaction unit 34. The thermal isolation member 41 may be made of a thermal isolation material having lower thermal conductivity such as stainless steel, ceramics, zirconium, or other metal or nonmetal materials.

Here, the remaining surface excluding the outer surface of the first pipe 21 corresponding to the first reaction unit 37 is exposed, so that the thermal energy supplied from the first reaction unit 37 is released outwardly through the remaining surface.

In the fuel cell reformer according to this embodiment, the thermal isolation member 41 is disposed on the outer surface of the first pipe 21 corresponding to the reforming reaction unit 34, and the remaining outer surface of the first pipe 21 corresponding to the first reaction unit 37 is exposed, so that the reforming reaction unit 34 and the first reaction unit 37 are supplied with the thermal energy corresponding to the unique operational temperature ranges thereof from the thermal source unit 31.

Now, operations of the fuel cell reformer 100 according to this embodiment of the present invention will be described in detail.

Firstly, the fuel and the air are injected into the inner space of the second pipe 22 through the first injection hole 32a of the torch member 32.

In this state, when the igniter plug (not shown) is operated, the fuel and the air are sprayed into the inner space of the second pipe 22, and the fuel is burned by the ignition of the igniter plug, so that the thermal source unit 31 generates the thermal energy. The thermal energy is supplied to the reforming reaction unit 34 and the first reaction unit 37 through the second pipe 22.

The operation is performed at the time of initial driving of the fuel cell reformer 100, and the thermal isolation member 41 is disposed on the outer surface of the first pipe 21 corresponding to the reforming reaction unit 34. Therefore, the thermal energy supplied to the reforming reaction unit 34 is isolated by the thermal isolation member 41, so that the thermal energy supplied to the reforming reaction unit 34 cannot be released outwardly through the first pipe 21. As a result, the reforming reaction unit 34 maintains the preheated state in the unique operational temperature range of from 700° C. to 800° C. In addition, the outer surface of the first pipe 21 corresponding to the first reaction unit 37 is exposed, so the thermal energy supplied to the first reaction unit 37 is released outwardly through the outer surface. As a result, the first reaction unit 37 maintains the preheated state in the unique operational temperature range of from 200° C. to 500° C.

At the time of normal driving of the fuel cell reformer 100, the thermal source unit 31 continuously generates thermal energy, and the fuel and the water are supplied to the first region A between the first and second pipes 21 and 22 through the second injection hole 34a of the reforming reaction unit 34.

As a result, in the reforming reaction unit 34, that is, the first region A between the first and second pipes 21 and 22, the water reforming reaction of the fuel and water by the reforming catalyst 35 is performed to generate the reforming gas containing hydrogen. At this time, in the reforming reaction unit 34, an incomplete reforming reaction of the fuel may occur to generate the reforming gas containing the carbon monoxide as a by-product.

Next, the reforming gas is supplied to the first reaction unit 37, that is, the second region B between the first and second pipes 21 and 22 through holes 39a of the barrier member 39. In the first reaction unit 37, the water gas shift reaction of the carbon monoxide by the water gas shift catalyst 38 is performed to reduce the concentration of carbon monoxide.

After that, the reforming gas of which concentration of carbon monoxide is reduced is discharged through the second discharging hole 37a of the first reaction unit 37 to be supplied to the fuel cell (not shown).

Figure 3:
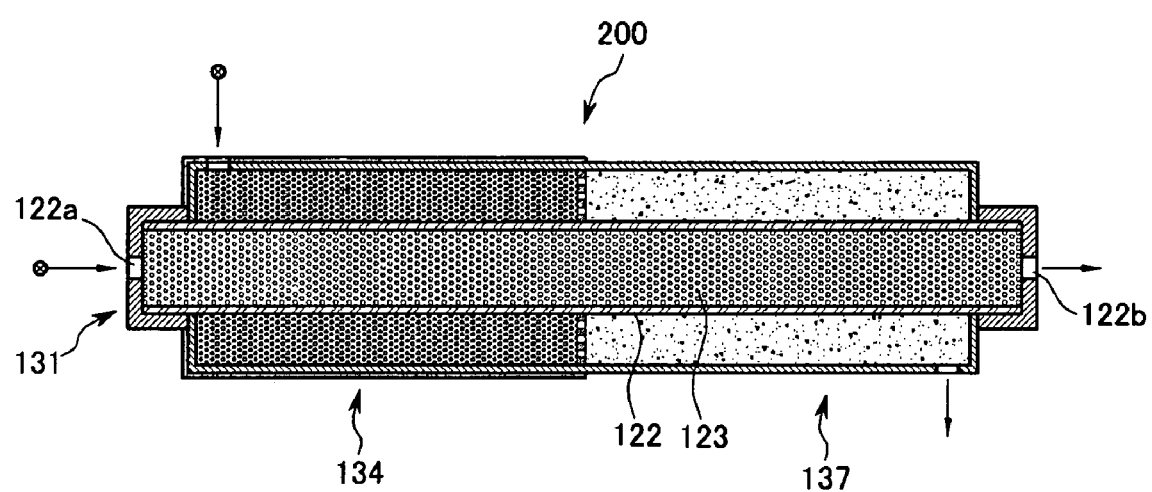
FIG. 3 is a cross-sectional view of a fuel cell reformer according to a second embodiment of the present invention.

FIG. 3 is a cross-sectional view of a fuel cell reformer according to a second embodiment of the present invention.

Referring to FIG. 3, the fuel cell reformer 200 according to this embodiment has basically the same structure as the aforementioned fuel cell reformer 100 according to the first embodiment. In the second embodiment, the thermal source unit 131 is constructed by filling an inner space of the second pipe 122 with an oxidation catalyst 123.

The thermal source unit 131 has a structure for generating thermal energy through an oxidation reaction of the fuel and the air by using the oxidation catalyst 123. The thermal source unit 131 includes a first injection hole 122a, that is disposed at one end portion of the second pipe 122 to inject the fuel and the air into the inner portion of the second pipe 122, and a first discharging hole 122b, that is disposed at the other end portion of the second pipe 122 to discharge the combustion gas generated when the fuel is burned with the air by using the oxidation catalyst 123.

Here, the oxidation catalyst 123 has a function of precipitating the oxidation reaction of the fuel and the air. The oxidation catalyst 123 may have a structure where a catalytic material such as platinum (Pt) and ruthenium (Ru) is contained in a pellet-shaped carrier made of alumina ($Al_2O_3$), silica ($SiO_2$), or titania ($TiO_2$).

At the time of driving of the fuel cell reformer 200 in this embodiment, the fuel and the air are supplied to the inner portion of the second pipe 122 through the first injection hole 122a of the thermal source unit 131, and the thermal source unit 131 generates the thermal energy through the oxidation reaction of the fuel and the air by using the oxidation catalyst 123. The thermal energy is supplied to the reforming reaction unit 134 and the first reaction unit 137.

In this embodiment, since a gaseous fuel containing butane as a main component is used as the fuel that is burned with the air by using the oxidation catalyst 123, thermal energy is separately supplied to the oxidation catalyst 123 in order to maintain a preheated state of the oxidation catalyst 123 at a predetermined temperature.

Since other components and operations of the fuel cell reformer 200 according to the embodiment are the same as those of the aforementioned fuel cell reformer 100 according to the first embodiment, detail description thereof is omitted.

Figure 4:
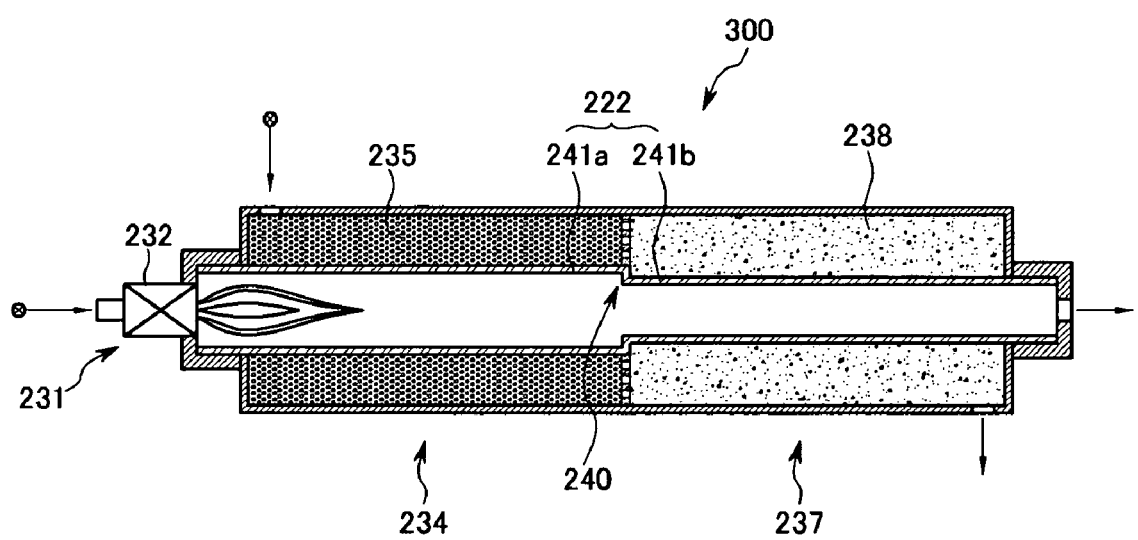
FIG. 4 is a cross-sectional view of a fuel cell reformer according to a third embodiment of the present invention.

FIG. 4 is a cross-sectional view of a fuel cell reformer according to a third embodiment of the present invention.

Referring to FIG. 4, the fuel cell reformer 300 according to the third embodiment includes a thermal treatment unit 240 of which cross-sectional areas corresponding to the reforming reaction unit 234 and the first reaction unit 237 of the second pipe 222 of the thermal source unit 231 are different from each other.

More specifically, in this embodiment, the thermal treatment unit 240 includes a first portion 241a of the second pipe 222 corresponding to the reforming reaction unit 234 and a second portion 241b of the second pipe 222 corresponding to the first reaction unit 237.

Here, the second pipe 222 has a constant thickness, and a diameter of the first portion 241a is larger than that of the second portion 241b. Namely, the cross-sectional area of the first portion 241a is larger than that of the second portion 241b.

Similar to the first embodiment, the thermal source unit 231 has a structure for igniting and burning the fuel with the air. More specifically, in the structure, a torch member 232 is connected to one end portion of the second pipe 222.

Therefore, in the thermal treatment unit 240, the second pipe 222 has a constant thickness, and the cross-sectional area of the first portion 241a is larger than that of the second portion 241b, so that a contact area of a reforming catalyst 235 of the reforming reaction unit 234 to an outer surface of the first portion 241a increases, and a contact area of the water gas shift catalyst 238 of the first reaction unit 237 to an outer surface of the second portion 241b decreases.

As a result, at the time of initial driving of the fuel cell reformer 300 according to this embodiment, the reforming reaction unit 234 and the first reaction unit 237 are supplied with thermal energy corresponding to the unique operational temperature ranges from the thermal source unit 231.

Since other components and operations of the fuel cell reformer 300 according to the embodiment are the same as those of the aforementioned fuel cell reformer 100 according to the first embodiment, a detailed description thereof is omitted.

Figure 5:
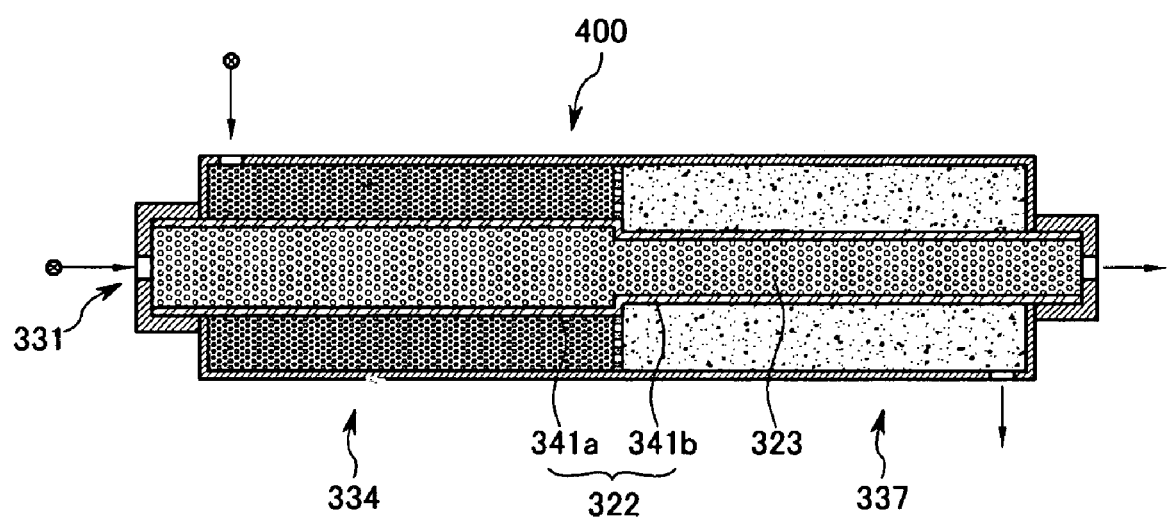
FIG. 5 is a cross-sectional view of a fuel cell reformer according to a fourth embodiment of the present invention.

FIG. 5 is a cross-sectional view of a fuel cell reformer according to a fourth embodiment of the present invention.

Referring to FIG. 5, the fuel cell reformer 400 has basically the same structure as the aforementioned fuel cell reformer 300 according to the third embodiment. Particularly, in the fourth embodiment, the thermal source unit 331 is constructed by filling an inner space of the second pipe 322 having first and second portions 341a and 341b with the oxidation catalyst 323.

The thermal source unit 331 has a structure for generating thermal energy through an oxidation reaction of the fuel and the air by using the oxidation catalyst 323 and supplying the thermal energy to a reforming reaction unit 334 and a first reaction unit 337.

In this embodiment, since a gaseous fuel containing butane as a main component is used as the fuel that is burned with the air by using the oxidation catalyst 323, the thermal energy is separately supplied to the oxidation catalyst 323 in order to maintain a preheated state of the oxidation catalyst 323 at a predetermined temperature.

Since other components and operations of the fuel cell reformer 400 according to the embodiment are the same as those of the aforementioned fuel cell reformers 200 and 300 according to the second and third embodiments, a detailed description thereof is omitted.

Figure 6:
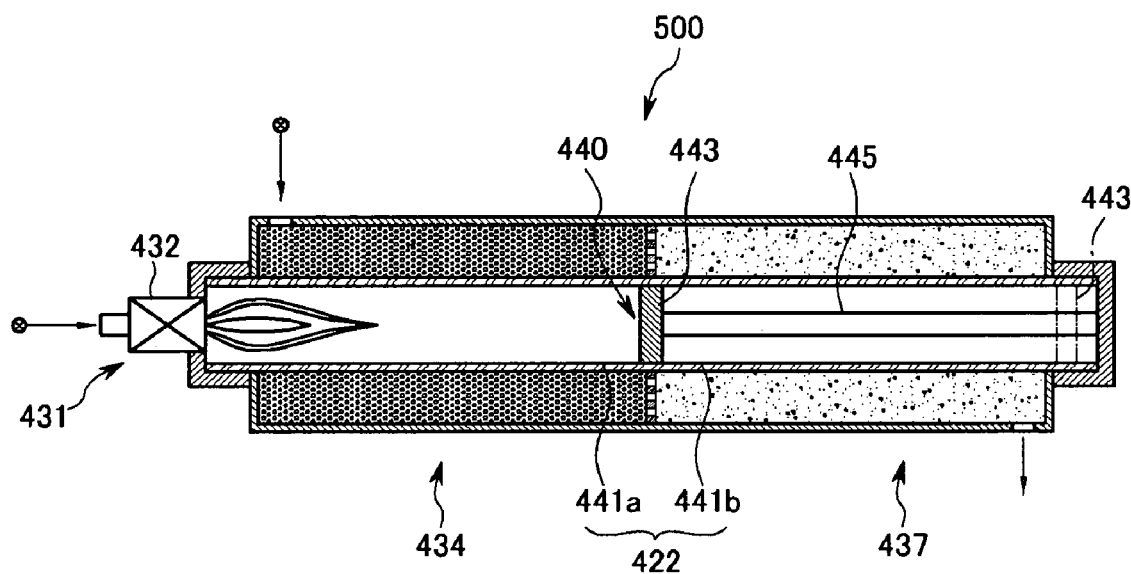
FIG. 6 is a cross-sectional view of a fuel cell reformer according to a fifth embodiment of the present invention.

FIG. 6 is a cross-sectional view of a fuel cell reformer according to a fifth embodiment of the present invention.

Referring to FIG. 6, the fuel cell reformer 500 according to this embodiment includes a thermal treatment unit 440 that is constructed by selectively partitioning an inner space of the second pipe 422.

Here, the second pipe 422 is partitioned into a first portion 441a corresponding to a reforming reaction unit 434 and a second portion 441b corresponding to a first reaction unit 437.

In this embodiment, the thermal treatment unit 440 includes a barrier member 443 that is disposed to perform a reciprocating motion in the inner space of the second pipe 422.

More specifically, the barrier member 443 is disposed in an inner portion of the second pipe 422 and has the shape of a circular disc corresponding to a cross section of the second pipe 422. The barrier member 443 is connected to a cylinder rod 445 of a general cylinder mechanism (not shown). The barrier member 443 is designed to perform a reciprocating motion in the inner space of the second portion 441b, wherein the boundary between the first and second portions 441a and 441b is a turning point of the reciprocating motion. Due to the reciprocating motion of the barrier member 443 in the inner space of the second portion 441b, the barrier member 443 has a function as a thermal isolation wall for preventing the thermal energy generated by the thermal source unit 431 from being transmitted into the space defined by the barrier member 443, that is, the inner space of the second portion 441b.

Similar to the first and third embodiments, the thermal source unit 431 has a structure for igniting and burning the fuel with the air. More specifically, in this structure, a torch member 432 is connected to one end portion of the second pipe 422.

In the operation of the fuel cell reformer 500 according to this embodiment, at the time of initial driving of the fuel cell reformer 500, the barrier member 443 moves from the boundary position between the first and second portions 441a and 441b to a position of the inner space of the second portion 441b indicated by a dotted-dashed line of FIG. 6.

In this state, the thermal source unit 431 ignites and burns the fuel with the air to generate the thermal energy. As a result, the first reaction unit 437 is supplied with the thermal energy generated by the thermal source unit 431 to maintain the preheated state in the unique operational temperature range.

After that, the barrier member 443 returns to the initial position by the driving of the cylinder mechanism. Therefore, the barrier member 443 prevents the thermal energy from being transmitted through the boundary position between the first and second portions 441a and 441b into the inner space of the second portion 441b. As a result, the reforming reaction unit 434 is supplied with the thermal energy generated by the thermal source unit 431 to maintain the preheated state in the unique operational temperature range.

Since other components and operations of the fuel cell reformer 500 according to the embodiment are the same as those of the aforementioned fuel cell reformer 100 and 300 according to the first and third embodiments, a detailed description thereof is omitted.

Figure 7:
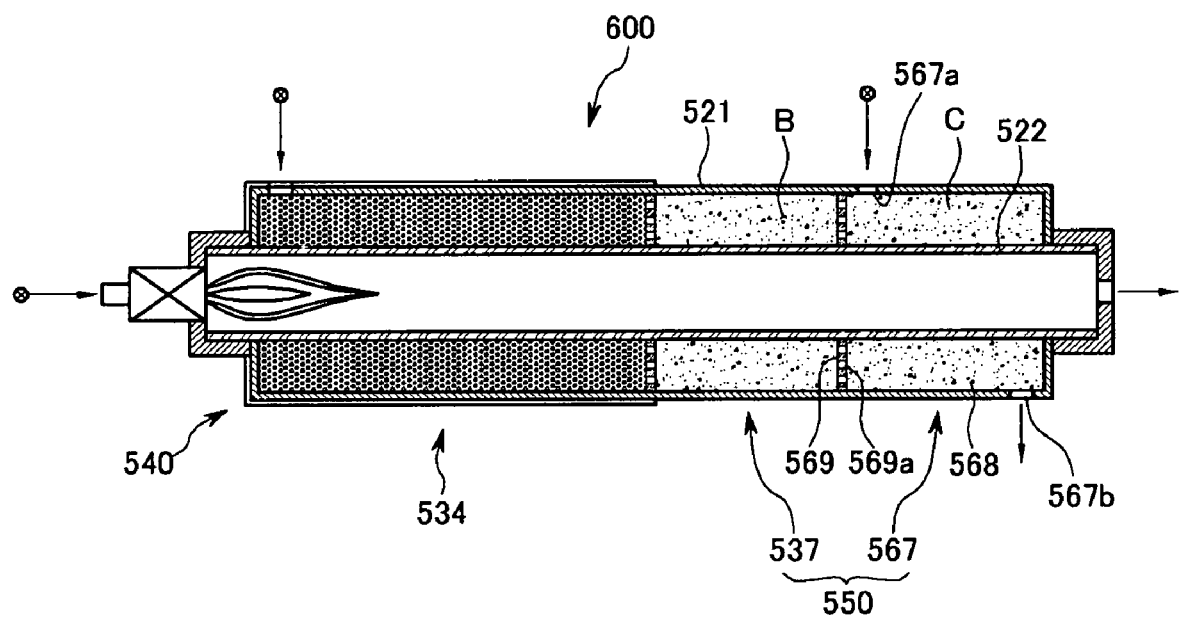
FIG. 7 is a cross-sectional view of a fuel cell reformer according to a sixth embodiment of the present invention.

FIG. 7 is a cross-sectional view of a fuel cell reformer according to a sixth embodiment of the present invention.

Referring to FIG. 7, the fuel cell reformer 600 according to this embodiment has basically the same structure as the aforementioned fuel cell reformer 100 according to the first embodiment. However, the fuel cell reformer 600 is provided with a carbon monoxide reduction unit 550 that is supplied with a reforming gas of which concentration of carbon monoxide is reduced from a first reaction unit 537 and secondarily reduces the concentration of carbon monoxide through a preferential CO oxidation (PROX) reaction for the carbon monoxide contained in the reforming gas.

In this embodiment, the carbon monoxide reduction unit 550 includes a second reaction unit 567 that is constructed by filling a third region C in the vicinity of a second region B between first and second pipes 521 and 522 with a preferential oxidation catalyst 568.

Here, the preferential oxidation catalyst 568 has a function of precipitating the preferential CO oxidation reaction in a temperature range of from 150° C. to 200° C. The preferential oxidation catalyst 568 may have a structure wherein a catalytic material such as platinum (Pt) and ruthenium (Ru) is contained in a pellet-shaped carrier made of alumina ($Al_2O_3$), silica ($SiO_2$), or titania ($TiO_2$).

The second and third regions B and C between the first and second pipes 521 and 522 are partitioned by a barrier member 569 having the shape of a mesh. The barrier member 569 includes a plurality of holes 569a and has the shape of a ring where the second pipe 522 passes through a central portion thereof.

In addition to the function of partitioning the inner space between the first and second pipes 521 and 522 into the second and third regions B and C, the barrier member 569 has a function of allowing the reforming gas of which concentration of carbon monoxide is reduced by the first reaction unit 537 to flow into the second reaction unit 567 through the aforementioned holes 569a.

In addition, the second reaction unit 567 is provided with a third injection hole 567a for injecting the air into the third region C in order to precipitate the CO oxidation reaction and a third discharging hole 567b for discharging the reforming gas of which concentration of carbon monoxide is secondarily reduced through the preferential CO oxidation reaction of the carbon monoxide and the air by using the preferential oxidation catalyst 568. The third discharging hole 567b is formed in the first pipe 521. The third discharging hole 567b may be connected to a fuel cell (not shown) with a pipe line or the like.

Similar to the first embodiment, the fuel cell reformer 600 includes a thermal treatment unit 540 that supplies thermal energy corresponding to the unique operational temperature conditions to the reforming reaction unit 534, the first reaction unit 537, and the second reaction unit 567. Since the thermal treatment unit 540 is the same as the thermal treatment unit 40 of the first embodiment, a detailed description thereof is omitted.

The fuel cell reformer 600 according to this embodiment has basically the same structure as the aforementioned fuel cell reformer 100 according to the first embodiment, but is not limited thereto. All the structures of the fuel cell reformers according to the aforementioned embodiments may be employed by the fuel cell reformer 600 according to this embodiment.

In the operation of the fuel cell reformer 600, at the time of initial driving of the fuel cell reformer 600, the reforming reaction unit 534 maintains a preheated state in an operational temperature range of from 700° C. to 800° C. The first reaction unit 537 maintains a preheated state in an operational temperature range of from 200° C. to 500° C. The second reaction unit 567 maintains a preheated state in an operational temperature range of from 150° C. to 200° C.

At the time of normal driving of the fuel cell reformer 600, the reforming reaction unit 534 generates the reforming gas containing hydrogen through a water reforming reaction of the fuel and the water.

Subsequently, the reforming gas is supplied to the first reaction unit 537. The first reaction unit 537 firstly reduces the concentration of carbon monoxide through a water gas shift reaction of the carbon monoxide contained in the reforming gas.

After that, the reforming gas of which the concentration of carbon monoxide is firstly reduced is supplied to the second reaction unit 567 through the holes 569a of the barrier member 569. The second reaction unit 567 secondarily reduces the concentration of carbon monoxide through the preferential CO oxidation reaction of the carbon monoxide contained in the reforming gas and supplies the reforming gas to the fuel cell.

Since other components and operations of the fuel cell reformer 600 according to the sixth embodiment are the same as those of the aforementioned fuel cell reformer 100 according to the first embodiment, a detailed description thereof is omitted.

According to the above-described embodiments of the present invention, a fuel cell reformer is provided with a thermal treatment unit that is capable of supplying thermal energy generated at the time of initial driving of the fuel cell reformer to a reforming reaction unit and a carbon monoxide reaction unit in operational temperature ranges thereof, so that it is possible to improve usage efficiency of the thermal energy required for the overall operations of the fuel cell reformer and to shorten an initial driving time of the fuel cell reformer. Accordingly, it is possible to maximize operational efficiency of the fuel cell reformer.

Although the exemplary embodiments and the modified examples of the present invention have been described, the present invention is not limited to the embodiments and examples, but may be modified in various forms without departing from the scope of the appended claims, the detailed description, and the accompanying drawings of the present invention. Therefore, the scope of the present invention is limited only by the appended claims and their equivalents.

What is claimed is:

1. A fuel cell reformer, comprising:
   a main body comprising a first pipe and a second pipe, the second pipe being disposed at an inner portion of the first pipe;
   a thermal source unit in the second pipe and for generating heat;
   a reforming reaction unit in a first region between the first pipe and the second pipe and for generating a reforming gas containing hydrogen through a reforming reaction of a fuel;
   a carbon monoxide reduction unit in a region other than the first region between the first pipe and the second pipe and for reducing a concentration of carbon monoxide contained in the reforming gas; and
   a thermal treatment unit for supplying thermal energy to the reforming reaction unit and to the carbon monoxide reduction unit at a time of initial driving of the reformer, wherein the thermal energy supplied to the reforming reaction unit corresponds to an operational temperature range of the reforming reaction unit that is unique, and the thermal energy supplied to the carbon monoxide reduction unit corresponds to an operational temperature range of the carbon monoxide reduction unit that is unique.

2. The fuel cell reformer of claim 1, wherein the thermal treatment unit is configured to allow the reforming reaction unit to maintain the operational temperature range of the reforming reaction unit, which is higher than the operational temperature range of the carbon monoxide reduction unit.

3. The fuel cell reformer of claim 1, wherein the carbon monoxide reduction unit comprises a first reaction unit disposed in a second region proximate to the first region to reduce the concentration of carbon monoxide through a water gas shift reaction of the carbon monoxide.

4. The fuel cell reformer of claim 3, further comprising a barrier member having a shape of a mesh and being disposed between the first pipe and the second pipe to partition the first region and the second region.

5. The fuel cell reformer of claim 3, wherein the thermal treatment unit is configured to allow the reforming reaction unit to maintain the operational temperature range of the reforming reaction unit of from 700° C. to 800 C. and is configured to allow the first reaction unit to maintain the operational temperature range of the first reaction unit of from 200° C. to 500 C.

6. The fuel cell reformer of claim 3, wherein the carbon monoxide reduction unit comprises a second reaction unit disposed in a third region proximate to the second region to reduce the concentration of carbon monoxide through a preferential oxidation reaction of the carbon monoxide.

7. The fuel cell reformer of claim 6, further comprising a barrier member, having a shape of a mesh, disposed between the first pipe and the second pipe to partition the second region and the third region.

8. The fuel cell reformer of claim 6, wherein the thermal treatment unit is configured to allow the reforming reaction unit to maintain the operational temperature range of from 700° C. to 800° C. and is configured to allow the second reaction unit to maintain an operational temperature range of the second reaction unit of from 150° C. to 200° C.

9. The fuel cell reformer of claim 1, wherein the thermal treatment unit comprises a thermal isolation member surrounding an outer surface of the first pipe corresponding to the reforming reaction unit to isolate the thermal energy supplied from the thermal source unit to the reforming reaction unit.

10. The fuel cell reformer of claim 1, wherein the thermal treatment unit comprises:
    a first portion of the second pipe corresponding to the reforming reaction unit; and
    a second portion of the second pipe corresponding to the carbon monoxide reduction unit, and
    wherein a cross-sectional area of the first portion is larger than that of the second portion.

11. The fuel cell reformer of claim 1, wherein the thermal treatment unit comprises a barrier member to perform a reciprocating motion in an inner space of the second pipe.

12. The fuel cell reformer of claim 1, wherein the thermal source unit comprises a torch member connected to the second pipe to ignite and burn the fuel.

13. The fuel cell reformer of claim 1, wherein the thermal source unit is constructed by filling an inner space of the second pipe with an oxidation catalyst to generate the thermal energy through an oxidation reaction of the fuel by using the oxidation catalyst.

14. The fuel cell reformer of claim 1, wherein the reforming reaction unit is constructed by filling the first region with a reforming catalyst.

15. The fuel cell reformer of claim 3, wherein the first reaction unit is constructed by filling the second region with a water gas shift catalyst.

16. The fuel cell reformer of claim 6, wherein the second reaction unit is constructed by filling the third region with an oxidation catalyst.

17. The fuel cell reformer of claim 1, wherein the fuel is a gaseous fuel containing butane as a main component.

18. The fuel cell reformer of claim 1, wherein the fuel is liquid petroleum gas.

19. The fuel cell reformer of claim 1, wherein the fuel is liquefied natural gas.

20. A fuel cell reformer, comprising:
    a main body comprising a first pipe and a second pipe, the second pipe being disposed at least partially within the first pipe;
    a thermal source unit proximate to the second pipe and for generating heat therein;
    a reforming reaction unit in a first region between the first pipe and the second pipe and for generating a reforming gas containing hydrogen through a reforming reaction of a fuel;
    a carbon monoxide reduction unit in a region other than the first region between the first pipe and the second pipe and for reducing a concentration of carbon monoxide contained in the reforming gas; and
    a thermal treatment unit for supplying thermal energy to the reforming reaction unit and to the carbon monoxide reduction unit at a time of initial driving of the reformer, wherein the thermal energy supplied to the reforming reaction unit corresponds to an operational temperature range of the reforming reaction unit, and the thermal energy supplied to the carbon monoxide reduction unit corresponds to an operational temperature range of the carbon monoxide reduction unit.

* * * * *